Figure 1:
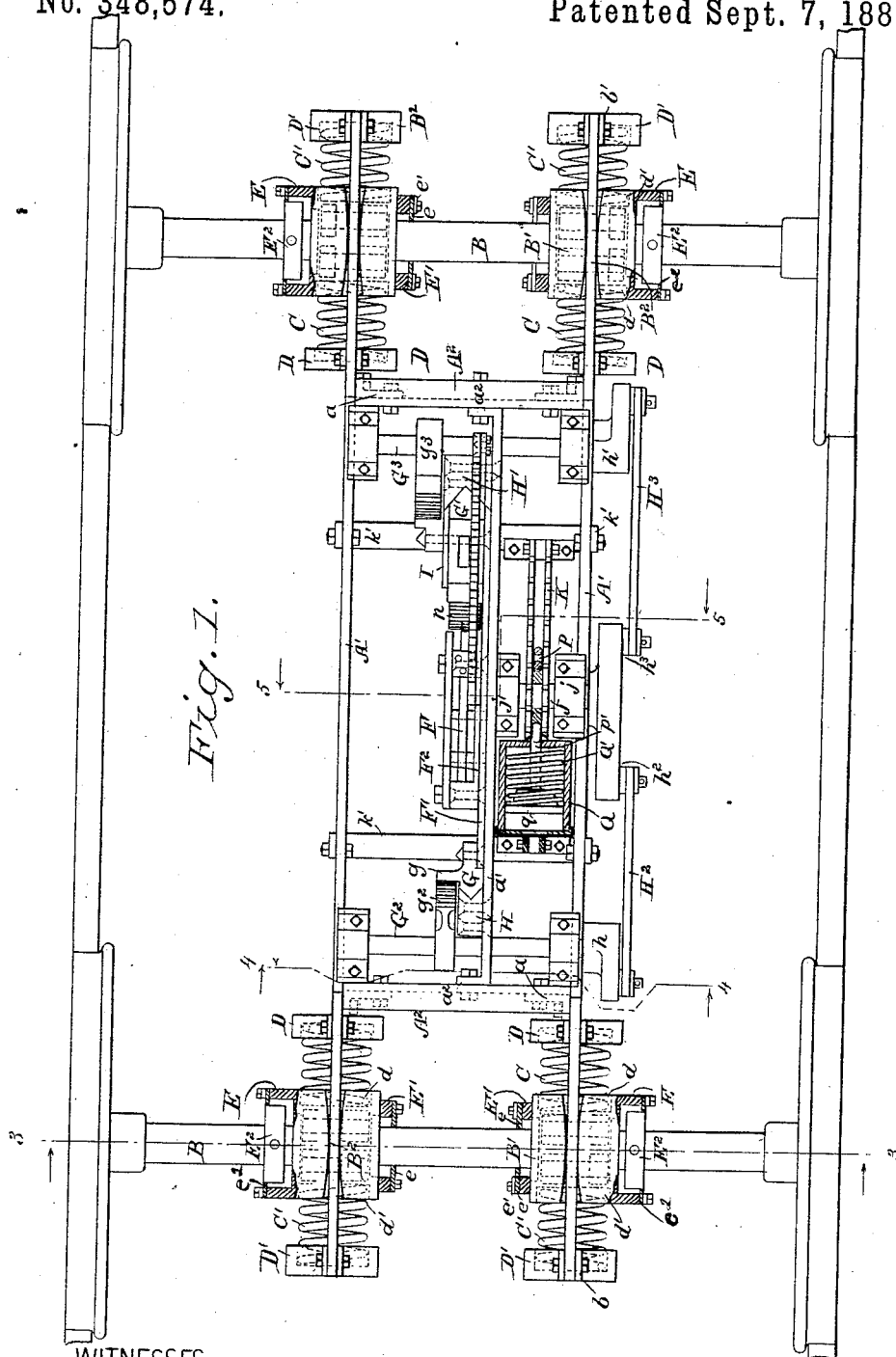

(No Model.) 9 Sheets—Sheet 1.

E. NOBLE, Jr., & G. F. BRANHAM.
ENDLESS CABLE CAR PROPELLING MECHANISM.

No. 348,574. Patented Sept. 7, 1886.

WITNESSES
Ed. A. Newman.
Al. C. Newman.

INVENTORS
Edward Noble, Jr.
George F. Branham,
By their Attorneys
Baldwin, Hopkins & Peyton.

(No Model.) 9 Sheets—Sheet 3.

E. NOBLE, Jr., & G. F. BRANHAM.
ENDLESS CABLE CAR PROPELLING MECHANISM.

No. 348,574. Patented Sept. 7, 1886.

WITNESSES
Ed. A. Newman.
Al. C. Newman.

INVENTORS
Edward Noble Jr.
George F. Branham,
By their Attorneys
Baldwin, Hopkins & Peyton (No Model.) 9 Sheets—Sheet 4.

E. NOBLE, Jr., & G. F. BRANHAM.
ENDLESS CABLE CAR PROPELLING MECHANISM.

No. 348,574. Patented Sept. 7, 1886.

WITNESSES
Ed. A. Newman.
Al. C. Newman.

By their Attorneys

INVENTORS
Edward Noble, Jr.
George F. Branham.

(No Model.) 9 Sheets—Sheet 5.
E. NOBLE, Jr., & G. F. BRANHAM.
ENDLESS CABLE CAR PROPELLING MECHANISM.
No. 348,574. Patented Sept. 7, 1886.
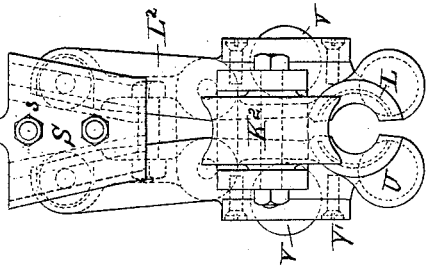
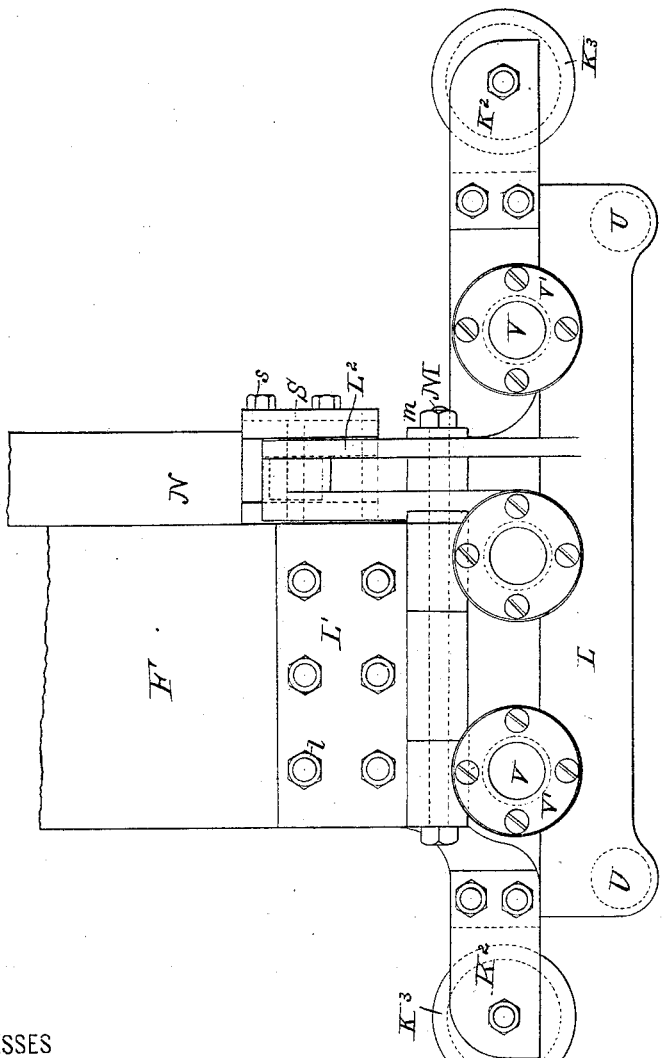
WITNESSES
Ed. A. Newman.
Al. C. Newman.
INVENTORS
Edward Noble, Jr.
George F. Branham,
By their Attorneys
Baldwin, Hopkins & Payton.

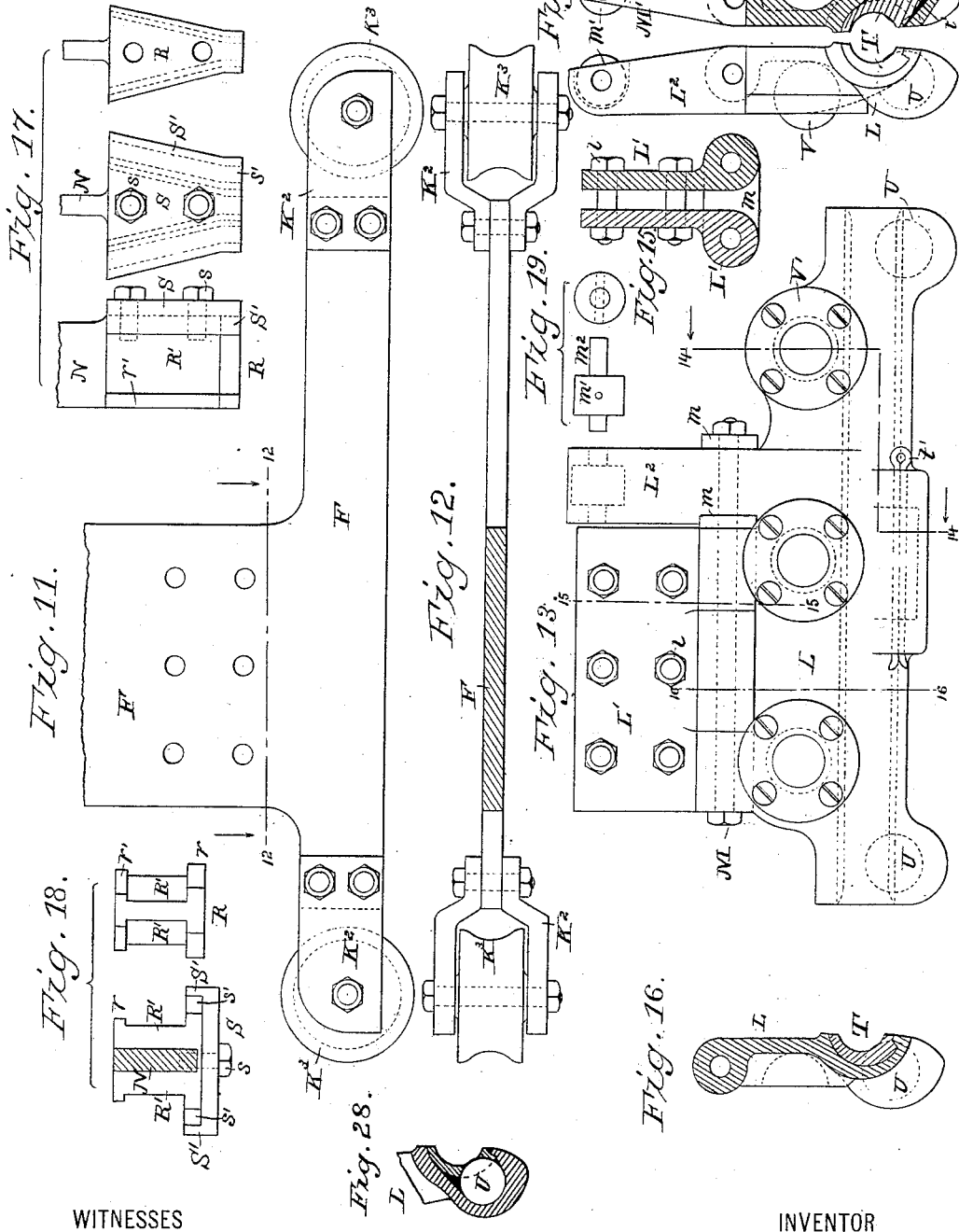

(No Model.) 9 Sheets—Sheet 7.
E. NOBLE, Jr., & G. F. BRANHAM.
ENDLESS CABLE CAR PROPELLING MECHANISM.
No. 348,574. Patented Sept. 7, 1886.
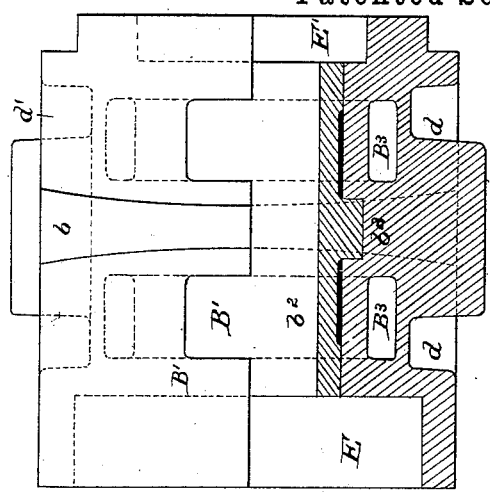
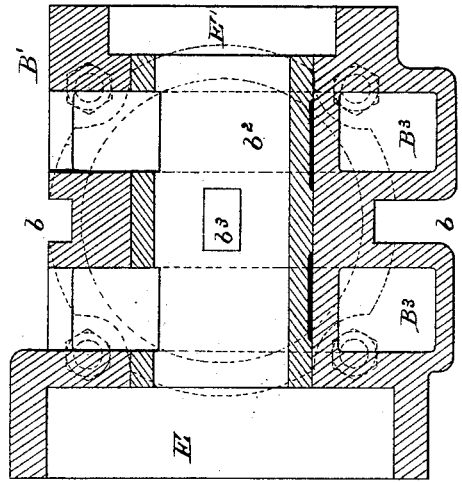
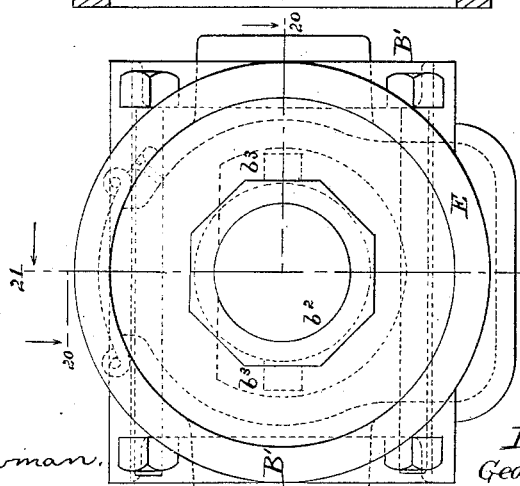
WITNESSES
Ed. A. Newman
A. C. Newman
INVENTOR
Edward Noble, Jr.
George F. Branham
By their Attorneys
Baldwin, Hopkins & Peyton (No Model.) 9 Sheets—Sheet 8.
E. NOBLE, Jr., & G. F. BRANHAM.
ENDLESS CABLE CAR PROPELLING MECHANISM.
No. 348,574. Patented Sept. 7, 1886.
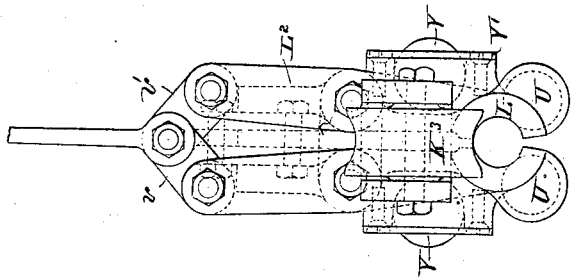
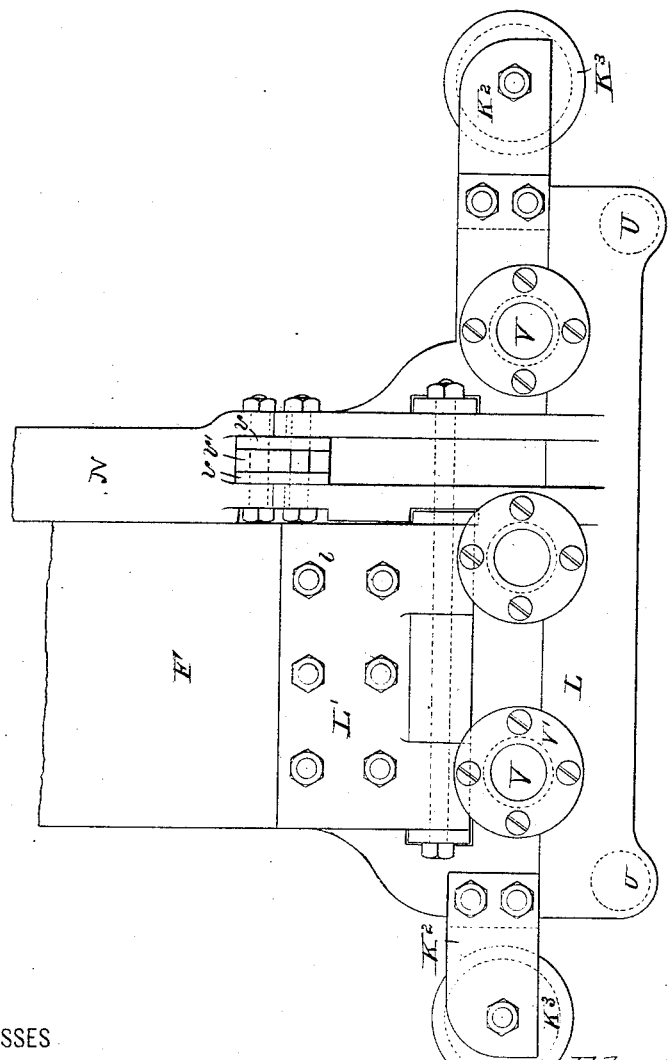
WITNESSES
Ed. A. Newman.
Al. C. Newman.
INVENTORS
Edward Noble Jr.
George F. Branham
By their Attorneys (No Model.) 9 Sheets—Sheet 9.

E. NOBLE, Jr., & G. F. BRANHAM.
ENDLESS CABLE CAR PROPELLING MECHANISM.

No. 348,574. Patented Sept. 7, 1886.

WITNESSES
Ed. A. Newman.
Al. C. Newman.

INVENTOR
Edward Noble, Jr.,
George F. Branham,
By their Attorneys

UNITED STATES PATENT OFFICE.

EDWARD NOBLE, JR., OF ST. LOUIS, MISSOURI, AND GEORGE F. BRANHAM, OF INDIANAPOLIS, INDIANA.

ENDLESS-CABLE CAR-PROPELLING MECHANISM.

SPECIFICATION forming part of Letters Patent No. 348,574, dated September 7, 1886.

Application filed March 1, 1886. Serial No. 193,681. (No model.)

*To all whom it may concern:*

Be it known that we, EDWARD NOBLE, Jr., of the city and county of St. Louis, in the State of Missouri, and GEORGE F. BRANHAM, of Indianapolis, in the county of Marion and State of Indiana, have invented certain new and useful Improvements in Endless-Cable Car-Propelling Mechanisms, of which the following is a specification.

Our invention relates to improvements in car-propelling mechanism of the class having suitably-driven endless cables in conduits beneath railways, along which cars are propelled by being engaged with the endless cables by means of gripping apparatus connected with the cars and projecting into the conduits by way of continuous longitudinal openings or slots thereof over the endless cables.

Our objects are to improve the cable-gripping apparatus; to lessen the jerking or jarring of the cars in starting; to facilitate the turning of curves; to reduce the strains upon parts, and, generally, to improve the mechanism.

The accompanying drawings show those parts illustration of which is needed to convey a proper understanding of our improvements as we prefer to organize them. Some of these improvements may, however, be used without the others or in connection with equivalents of omitted parts.

Figure 2:
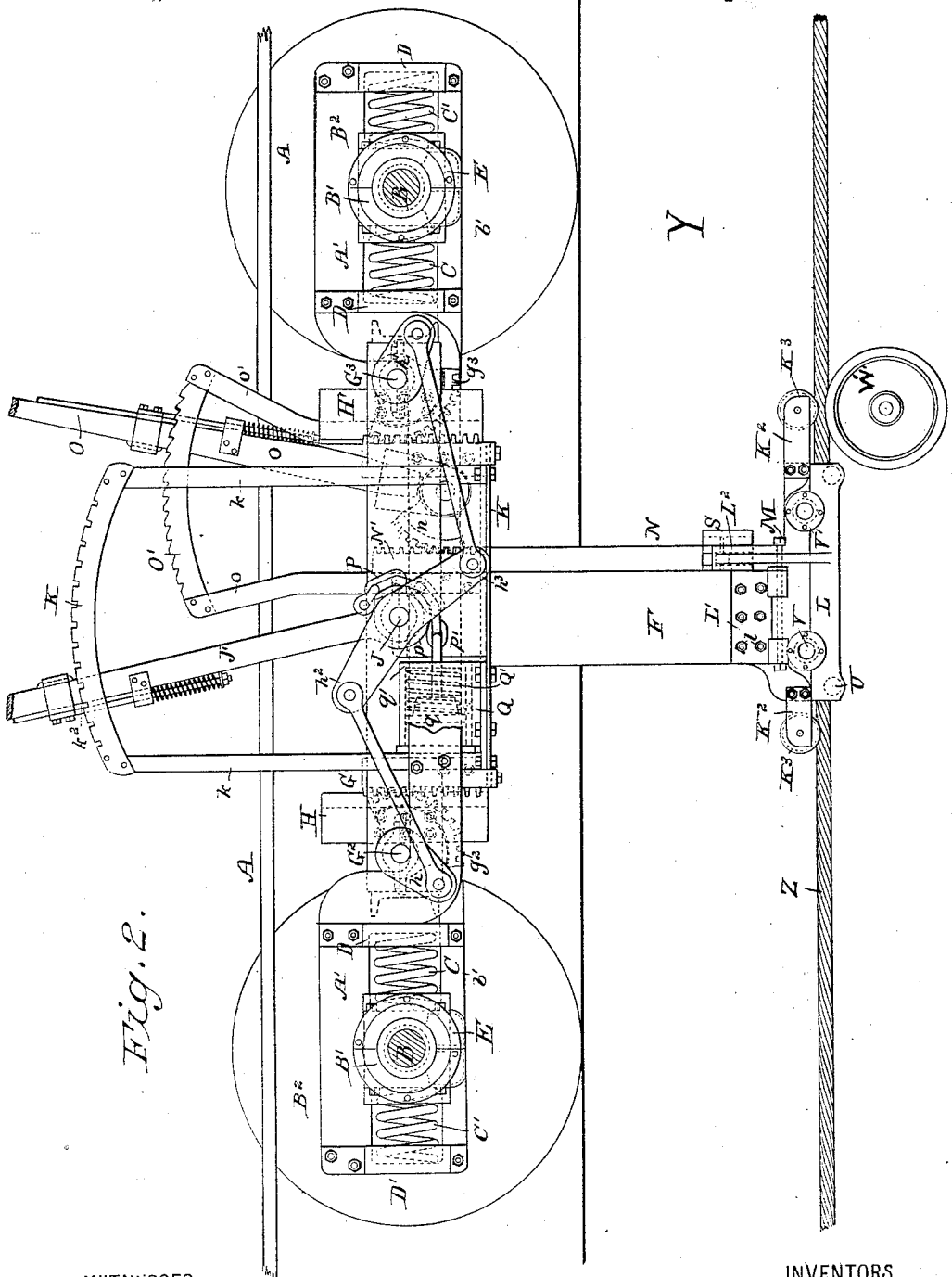
Figure 3:
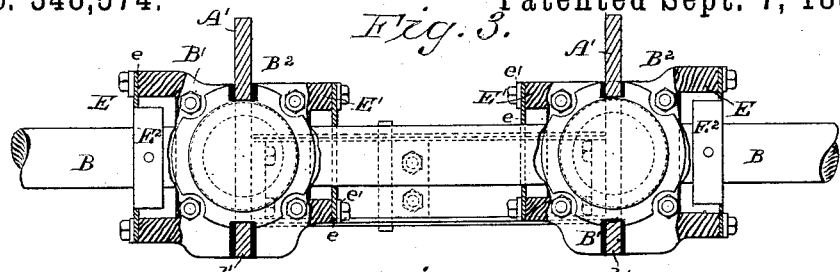
Figure 4:
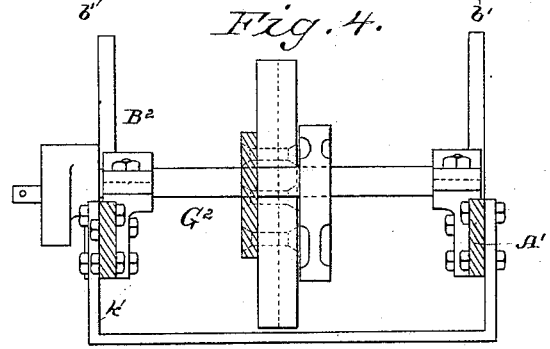
Figure 5:
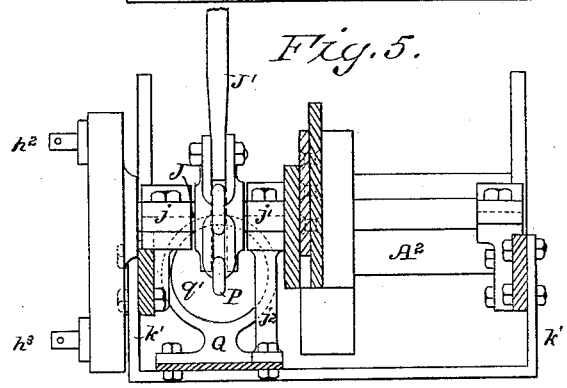
Figure 6:
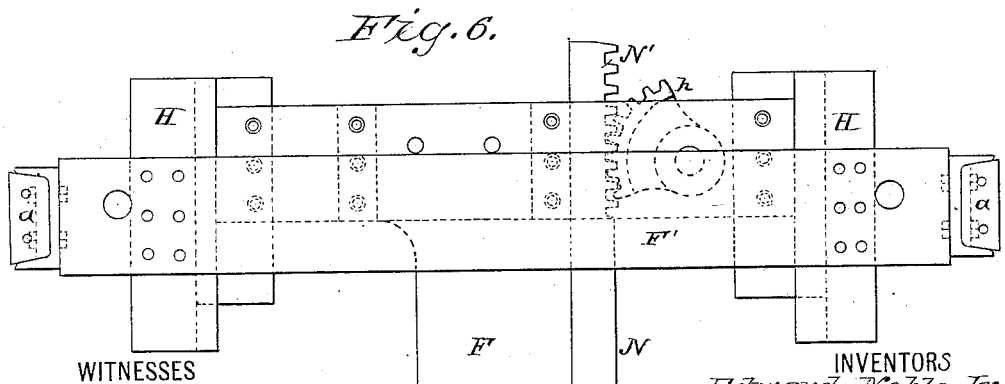
Figure 7:
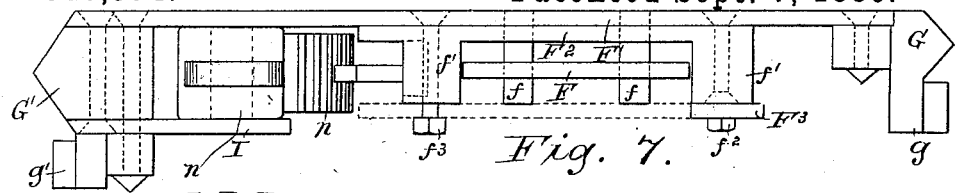
Figure 8:
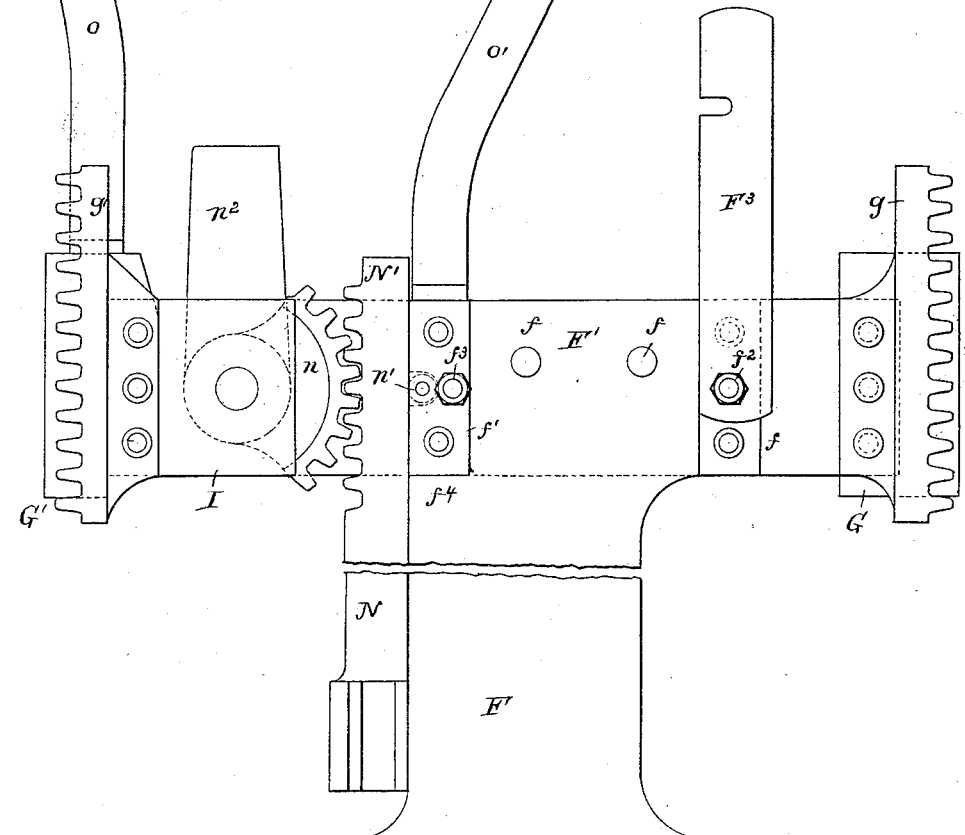
Figure 25:
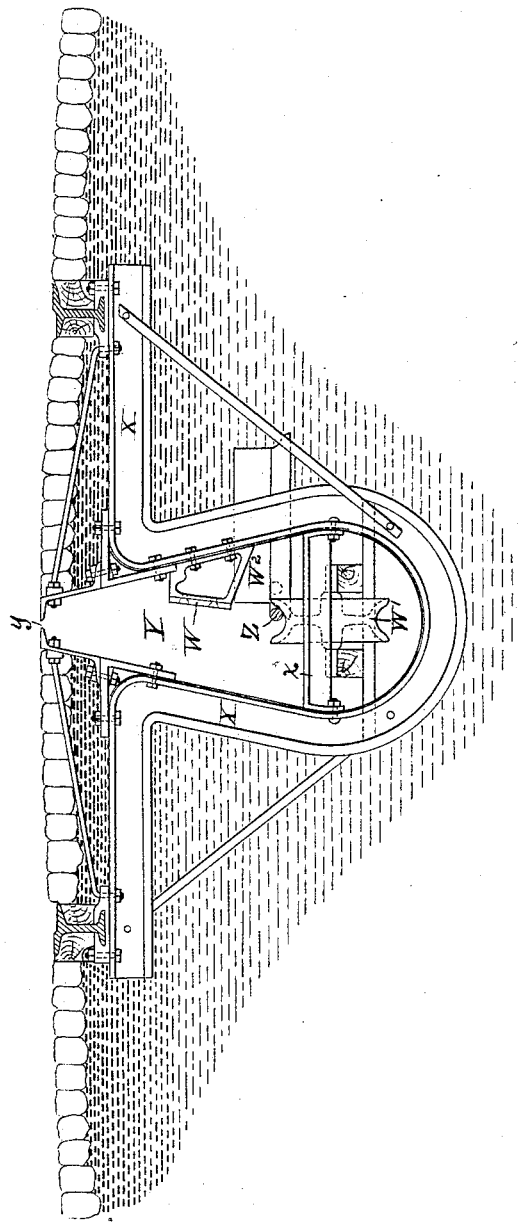

Figure 1 is a top or plan view with some parts omitted and others in section. Fig. 2 is a side elevation with the wheels of one side omitted and the axles in section. Fig. 3 is a view partly in elevation and partly in transverse section on the line 3 of Fig. 1. Figs. 4 and 5 are similar views, the sections being on the lines 4 and 5, respectively, of Fig. 1. Fig. 6 is a side elevation showing details of some parts of the gripping apparatus and its carrying-frame. Figs. 7 and 8, respectively, are a plan view and a side elevation of parts of the gripping apparatus, the reciprocating cross-head and its attachments being represented. Figs. 9 and 10, respectively, are a side and an end elevation showing details of the clamping jaws or gripper proper and adjacent parts. Fig. 11 is a side elevation, and Fig. 12 a plan view, partly in section, on the line 12 of Fig. 11, showing the lower end of the gripper-shank and its attached rollers for checking the downward movement of the gripping apparatus by their contact with the cable. Fig. 13 is a side elevation of the gripper-jaws and their attachments detached from the gripper-shank. Fig. 14 is an end elevation of the gripper-jaws, &c., with parts in section, on the line 14 of Fig. 13. Fig. 15 shows a section on the line 15 of Fig. 13, representing the hinge-plates by way of which the gripper-jaws are attached to the gripper-shank. Fig. 16 shows a section of one of the gripper-jaws on the line 16 of Fig. 13. Figs. 17, 18, and 19 show details of wedge-block mechanism by way of which the gripper-jaws are actuated to clamp and release the cable. Of these views Fig. 17 shows an elevation of the main section of the wedge-block and two elevations of the complete wedge-block, the one at right angles with the other. Fig. 18 shows a plan view of the complete wedge-block, its carrying-bar being in section, and a bottom view of the main section of the block. Fig. 19 shows a longitudnal and an end view of one of the clamp-arm rollers and its shaft. Figs. 20, 21, and 22 show one of the boxes for connecting the carrying-frame with the axles, Fig. 20 being a view, partly in plan and partly in section, on the line 20 of Fig. 22, and Fig. 21 a section on the line 21 of Fig. 22, which is an end elevation. Figs. 23 and 24, respectively, show a side and an end elevation of the clamping-jaws and adjacent parts, and represent a modification. Fig. 25 is a sectional elevation representing the conduit and its mechanism. Fig. 26 is a side view showing details of one of the housings of the carrying-frame. Fig. 27 is a sectional elevation on the line 27 of Fig. 26. Fig. 28 is a sectional view showing one of the clamp-jaw anti-friction balls or rollers which come in contact with the cable.

A main or carrying frame for the gripping apparatus, provided beneath the timbers of the car-floor A, (partly shown in Fig. 2,) is in part formed by two side sections or main bars, A'. These main bars extend the full length of the carrying-frame, and are connected at the proper distance apart and strongly braced near their opposite ends by cross-bars $A^2$. These cross-bars of the carrying-frame are best made of channel-iron, and secured to the main bars of the carrying-frame by angle-blocks $a$, and bolts and nuts. An intermediate longitudinal bar, $a'$, completing the carrying-frame proper, is secured between the cross-bars and between and parallel with the side or main bars by means of bolts and nuts which fasten the bent ends $a^2$ of the intermediate bar to the cross-bars. (See Fig. 1.)

The car-body (not shown) is supported upon the axles B and their wheels by connection with the axles in well known way, provision being made, as usual, for slight horizontal swaying motion of the axles independently of the car-body and of each other in such way as to facilitate the turning of curves by allowing the axles to assume radial positions, as well understood.

The carrying-frame $A'$ $A^2$ $a'$ has a yielding or spring-controlled connection with the axles in such way that it may slide back and forth or reciprocate in the direction of its length and crosswise of the axles to a limited extent. Provision is also made for slight to-and-fro sidewise movement or reciprocation of the carrying-frame in the direction of the length of the axles. It is important that the carrying-frame be left free to move laterally independently of the axles to the extent needed to insure that by the self-adjustment of this frame sidewise the gripping apparatus carried thereby shall always be supported in proper position relatively to the conduit Y and endless cable Z. The spring-controlled endwise movement of the carrying-frame prevents the violent jerking and injurious jarring which would result, were this movement not provided for, upon suddenly starting the car, by engaging the gripping apparatus with the cable.

Provision is made for the above-mentioned endwise movement of the carrying-frame in the manner next to be described. Sectional bearing-boxes B', in which the axles turn, are each made in two parts bolted together, and formed with top and bottom guideway-grooves, $b$, made narrowest midway their length and gradually widened toward their ends. There are two of these boxes B' for each axle, and they are connected with the carrying-frame by the engagement with their guideway-grooves of housings B², provided at the ends of the carrying-frame. These housings are shown as formed partly by the ends of the main bars of the carrying-frame. Each of these bars is bent upward near its opposite ends, and then extends horizontally again, so as to cross above the axles and rest in the top guideway-grooves of the boxes. To the ends of the main bars are attached housing-bars $b'$, which extend beneath the axles, engage the bottom guideway-grooves of the boxes, and are bent near their ends, where they are bolted to the ends of the main bars. The bottom bars, $b'$, of the housings, in addition to being bolted at their inner ends to the main bars, are strongly connected with these bars by sectional brackets secured by bolts, and constituting seats or sockets for springs, as soon to be explained.

The housings are made of sufficient length to allow them to slide in the guideway-grooves of the boxes to the extent needed to admit of the desired endwise movement of the carrying-frame. As the central portions of the guideway-grooves $b$ are wide enough to receive the housings without binding, and as each of the grooves flares or widens in both directions from its middle or toward each end, it will be seen that horizontal swinging movement of the boxes relatively to the carrying-frame is allowed, and in this way cramping is prevented. When turning curves, the axles are thus allowed to assume positions radial thereto. The boxes B' and housings B² support coiled springs C C', which gradually check the endwise movement of the carrying-frame relatively to the axles in starting the car, and under ordinary circumstances, when the car is in motion, prevent any appreciable endwise movement of the carrying-frame. One of the springs C and one of the springs C' are provided for each box and its housing. Each spring C is supported at one end by a socket or seat, D, with which each housing is provided at its inner end, and at its other end the spring is supported by an annular groove or socket, $d$, with which each box is provided at its inner end. The springs C' are supported at their opposite ends in sockets D' $d'$, provided, respectively, at the outer ends of the housings and boxes. The ends of the springs project into the seats or sockets of the boxes and housings, and, as will readily be understood, these springs, while allowing of the desired endwise movement of the carrying-frame relatively to the axles, serve, after gradually checking this movement, to restore the carrying-frame to its normal position, (see Fig. 1,) and to maintain it in this position ordinarily.

The sidewise movement of the carrying-frame is provided for by allowing of a sliding movement of the boxes B' along the axles, as next to be explained. Each box is formed with an annular flange, E, at its outer side, and with a flange, E', at its inner side similar to, but, as shown, of somewhat less diameter and prominence than the outer flange. The inner annular flange, E', of each box has a guard-collar, $e$, of rubber or equivalent material fastened to it in suitable way—as by a flange ring or washer, $e'$, and securing bolts or screws. The collars embrace the axles and serve as inner dust-guards for the boxes. Guard-collars $e^2$ are secured to the outer flanges, E, of the boxes in the same way that the inner collars, $c$, are secured in place and are made of material such as that composing the inner collars. These outer dust-guard collars, $e^2$, instead of directly embracing the axles, embrace collars E², detachably clamped on the axles. Set-screws serve to hold these collars E² in place within the chambers formed by the flanges E, and at proper distances from the main portions or bodies of the boxes to act as stops to limit the sliding movement of the boxes on the axles. The diameter of the stop-collars is sufficiently less than the internal diameter of the flanges E to guard against the possibility of these parts coming in contact, and the yielding collars $e^2$ fill the spaces between the flanges and stop-collars, thus effectually excluding dust from the outer sides of the boxes.

Each box B' is provided with two oil-reservoirs, $B^3$. These reservoirs are located on opposite sides of the central portion of the box, so that it may be provided on its top and bottom with the guideway-grooves. The bearing bushing or brass $b^2$ is provided with retaining-lugs $b^3$, which enter sockets in the opposite sections of the box. When the sections are bolted together, the bearing is firmly held against endwise or turning movement, while it may readily be removed by separating the sections. The sockets for the retaining-lugs are formed in the solid central portion of the box between the oil-reservoirs. Cotton or similar substance insures the application of the oil to the axle, the oil being carried up by the cotton, as will readily be understood.

The gripping apparatus (as in this instance shown) is constructed and adjustably connected with its hereinbefore-described carrying-frame, as next to be explained. The gripper stem or shank F, carrying at its lower end the cable-clamping jaws or gripper proper is strongly but detachably connected at its upper end with a vertically-adjustable carrier-bar or cross-head, F', by the side of and parallel to the intermediate bar, $a'$, of the carrying-frame. The connection of the gripper-shank with its cross-head is by means of a receiving-block, $F^2$, riveted to the cross-head, and dowel-pins $f f$, firmly fixed in the receiving-block and cross-head. The receiving-block is provided with laterally-projecting lugs or flanges $f' f'$ at its opposite ends. The gripper-shank is fitted upon the dowel-pins with its edges close to these lugs, and a very strong connection is thus made. A latch-bar, $F^3$, pivoted at one end to the receiving-block by a bolt, $f^2$, secured in one of its lugs $f'$, is provided with an edge notch near its opposite end, to engage with a pin or bolt, $f^3$, secured to the other lug of the receiving-block. When the latch-bar is down or in its locked position, it limits the sidewise movement and prevents accidental displacement of the gripper-shank. When it is desired to displace the gripper-shank by slipping it from the dowel-pins, the latch-bar is swung up. The width of the space between the latch-bar and the back plate of the receiving-block is sufficiently greater than the thickness of the gripper-shank to allow of the slight movement of the gripper-shank along the dowel-pins, which at times takes place, as when the conduit-slot is not quite parallel to the track along which the car is propelled. The gripper-shank is formed with a shoulder, $f^4$, at one edge, near its upper end, and this edge from the shoulder downward is in the same vertical plane as the end of the receiving-block above the shoulder. In this way a regular bearing-surface is provided for a vertically-sliding clamp-actuating bar, by way of which to open as well as close and fasten the cable clamp or gripper jaws, as further on to be described.

The cross-head F' is rendered vertically adjustable by guideways connecting it with the carrying-frame, the cross-head being provided at its opposite ends with slide-blocks or sliders G G', which reciprocate vertically in grooves in way-blocks H H' of the carrying-frame. These way-blocks are fastened to the intermediate bar, $a'$, of the carrying-frame near its ends by rivets. The slider G is riveted to one end of the cross-head, and formed with a toothed bar or gear-rack, $g$, and the slider G' and a gear rack, $g'$, are riveted to the opposite end of the cross-head. A plate, I, interposed at one end between the slider G' and gear-rack $g'$, is rigidly connected with the cross-head by the rivets which secure the slider and gear-rack thereto. The plate I aids in making connection of a segment-gear, $n$, with the cross-head by which it is carried, in manner and for a purpose in turn to be explained.

Segment-gears $g^2 g^3$, fastened to rock-shafts $G^2$ and $G^3$, respectively, engage with their respective gear-racks $g$ and $g'$. The rock-shafts $G^2 G^3$ extend crosswise of the carrying-frame, and one near each of the cross-bars $A^2$ thereof. The rock-shafts are mounted at their opposite ends in bearings secured to the main bars A' of the carrying-frame in suitable way. Each rock-shaft is cranked at one end, and the cranks $h h'$ are connected by links or rods $H^2 H^3$ with cranks $h^2 h^3$ of an actuating rock-shaft, J. These cranks $h^2 h^3$ are shown as formed by a single bar slightly bent midway its length where it connects with its rock-shaft, one of the cranks projecting above and the other beneath the rock-shaft. This actuating rock-shaft is supported by connection with the carrying-frame, being mounted in box-bearings $j j'$. The bearing $j$ is secured to one of the main bars A' and the bearing $j'$ by the side of the intermediate bar, $a'$, of the carrying-frame midway its length.

A controlling-lever, J', by which to raise and lower the gripping apparatus, is fastened at its lower end to the actuating rock-shaft, and projects at its upper end through a slot in the car-floor, so as to be convenient to the operator. This slot for the controlling-lever to work in is formed in a trap-door in the car-floor, by way of which the gripping apparatus or parts thereof may be inspected and removed, as will readily be understood. Detent devices for locking the controlling-lever J' in position are provided. These devices may be of any suitable well-known construction. As shown, the detent-rack K (above the car-floor) is made in two parts, with the controlling-lever passing between them, and this rack is secured at its ends to the upper ends of the two standards $k$. These standards at their lower ends have supporting connection with the carrying-frame, being bolted by base-flanges to a plate, K', of the carrying-frame. This frame-plate K' is attached to the main bars A' of the carrying-frame by two stirrup-hangers, k', the upturned ends of which are bolted or riveted to these main bars. The inner bearing, j', for the actuating rock-shaft is attached to the frame-plate by being bolted thereto by way of a supporting-post, j². (See Fig. 5.)

From the above description it will be seen that by way of the controlling-lever the gripping apparatus, while strongly connected with the carrying-frame, may readily be raised and lowered and be locked in position by means of a spring-actuated detent, k², controlled by the operator in well-known way engaging with the rack K.

At its lower end the gripper-shank F is provided with two oppositely-projecting arms, K², carrying at their ends check-rollers K³, which, by contact with the cable Z, prevent too great downward movement of the gripping apparatus when being adjusted.

The two jaws L of the cable clamp or gripper proper are hinged to the gripper-shank at its lower end by way of two hinge-plates, L', secured by bolts l to the opposite sides of the gripper-shank. The pintle bearings or knuckles of the jaws and hinge-plates receive the pintles or pivot-pins M in obvious way, and the heads and the screw thread and nuts at the opposite ends of the pintles provide for holding them in place, while admitting of ready separation of parts.

Upwardly-projecting arms L², for connecting the clamp-jaws with actuating mechanism, by way of which to cause the gripping apparatus to clamp or release the cable, are shown as formed with the clamp-jaws—one for each jaw—close to one end of the hinge-plate to which the jaw is jointed. Jointing-plates or strengthening-links m connect the hinge-pintles M at the juncture of these arms with the jaws. The inner sides or adjacent faces, M', of the clamp-arms L² are inclined, so that the space between them is widest at top and narrowest at bottom, the faces converging from the top downward. (See Fig. 14.) Each clamp-arm is provided near its upper end with an anti-friction roller, m', these rollers being opposite each other and projecting inwardly or beyond the inclined faces of the clamp-arms. The rollers are detachably fastened to their shafts m² and fit loosely in sockets in the clamp-arms. One end of the shaft m² of each roller extends through and beyond its bearing in the clamp-arm and projects from the outer surface thereof.

A clamp-actuating bar, N, having a gear-rack, N', at its upper end, is reciprocated vertically by means of a segment-gear, n, carried by the cross-head F' of the gripping apparatus. The segment-gear is pivoted between the plate I and the cross-head, its pivot being supported by this plate and the cross-head and its hub extending between them. The bar N slides near its upper end in contact with an anti-friction roller, n', which prevents cramping. A lever, O, for actuating the segment n to raise and lower the clamp-actuating bar N, is shown as detachably attached to the segment by a socket-connection therewith. Either a socket at the lower end of this lever engages a lug, n², on the segment, Fig. 8, or the socket may be formed with the segment and the lever fitted therein. (See Fig. 2.) The lever O is locked in the desired position by suitable detent devices of well-known construction. The rack O' of these devices is fastened at its ends to the upper ends of bars o o', supported by being firmly connected at their lower ends with the cross-head F'. A wedge-block at the lower end of the bar N (the details of construction of the wedge-block will further on be described) completes the mechanism for actuating the clamp to open and close the jaws thereof.

It will be seen that as the clamp-actuating mechanism is carried by the cross-head of the gripping apparatus it partakes of the rising and falling movements of the gripper-shank, and yet may be independently operated at will to clamp and release the cable.

The weight of the gripping apparatus is counterbalanced to prevent unnecessary exertion on the part of the operator in adjusting the apparatus and lessen the liability to accident. As shown, a short chain, P, is made fast at one end to the controlling-lever J', and partially encircles the pulley-like boss or grooved hub p of this lever. At its other end the chain is connected by way of a rod, p', with a reciprocating plate or piston, q, in a casing or cylinder, Q, secured to the frame-plate K'. The piston-rod p' enters to the cylinder by way of an opening in its head q', against which one end of a coiled spring, Q', bears. The other end of this spring bears against the piston q. It will be obvious that this spring acts with a tendency to move the controlling-lever and the actuating rock-shaft J in such way as to lift the gripping apparatus, if in its lowered position, or else to prevent accidental downward movement of the gripping apparatus if in its elevated position, by preventing premature movement of the actuating rock-shaft.

The wedge-block of the clamp-actuating mechanism is shown as composed of two sections, one of them—the main section or wedge-block proper, R—being formed with the clamp-actuating bar N, and the other or auxiliary section, S, strongly secured to the main section by screws or bolts s. The main section or wedge-block proper is provided with two inclined track-grooves or roller-ways, R', at its opposite sides, in contact with which work the anti-friction rollers m' of the clamp-arms L². These roller-ways are formed between the front flanges, r, and back flanges, r', of the wedge-block, these flanges lapping the ends of the rollers. The rear flanges, r', by contact with the rollers, serve as stops to prevent accidental movement of the wedge-block outward or away from the gripper-shank, as will readily be understood. Track grooves or ways $s'$, for the projecting ends of the roller-shafts $m^2$, are formed between the front flanges, $r$, of the main section of the wedge-block and inwardly-projecting flanges $S'$ at the opposite edges of the clamp-section S.

It will be seen that in operation the wedge-block, when forced downward, acts upon the rollers of the clamp-arms to cause the clamp-jaws to grip the cable, and that when the wedge-block is raised the clamp-arms are spread apart, to release the cable, by the action upon the roller-shafts of the ways $s'$. The wedge-block is thus made double-acting, serving to positively and forcibly control both the closing and opening of the clamp.

The clamp-jaws L, where they grip the cable, are provided with suitable detachable wearing bushings or linings, T, which, when worn by frictional contact with the cable, may be replaced by others.

As shown by Figs. 13 and 14, the linings are fitted and removably secured in place as follows: A jaw, L, is formed with a curved recess extending its full length to receive the lining, and midway this recess there is provided a socket, $T'$, into which projects a lug, $t$, of the lining. This securing-lug is held in the socket in suitable way—as by a split pin, $t'$, passing through it and through the end walls of the socket. The lining is thus detachably fastened in place.

To prevent unnecessary wear of parts, the clamp-jaws are provided with interior anti-friction ball-rollers, U, which come in contact with the cable, and rotate in their sockets when the cable is not tightly gripped, thus preventing the wear which would result were the rollers dispensed with and the clamp-jaws allowed to slide along the cable. These rollers are non-yielding, being made of hard metal, and, it should be noticed, are arranged in pairs near the opposite ends of the clamp-jaws and project to a slight extent beyond the inner surfaces of the linings of the jaws. That the ball-like rollers U may be inserted and removed readily, and be held against accidental displacement by the linings T, the sockets for these rollers are formed as shown in Fig. 28.

To facilitate the turning of curves by the car while keeping the gripping apparatus in proper position, the clamp-jaws are provided with exterior anti-friction rollers, V. These are higher than the interior rollers, U, or nearer the hinges of the jaws, so as to move in contact with guards or curved ways in the conduit. One of these guardways, W, is shown in Fig. 25. They are located at the curves of the conduit, and their curvature is such relatively to that of the conduit-slot $y$ as to prevent injurious sidewise movement of the gripping apparatus, as will readily be understood. The rollers V are provided in suitable number—say two or three for each jaw—and are removably held in place in their sockets in the jaws by centrally-open bearing-caps or retaining-rings $V'$, secured in position by bolts or screws.

Cable-supporting rollers $W'$ and guard-rollers $W^2$ at curves are provided in the conduit, as usual. Each yoke X of the conduit is strengthened by a cross-brace, $x$, of angle-iron, bolted at its flanged opposite ends to the yoke.

By the modification represented by Figs. 23 and 24 a toggle-joint connection between the clamp-actuating bar N and the clamp-arms $L^2$ is substituted for the before-described wedge-block and roller connection between these parts. As shown, the actuating-bar is forked at its lower end, and the clamp-arms are forked at their upper ends. Two toggle-links, $v$, pivoted at their opposite ends, respectively, in the forks of the actuating-bar and of one of the clamp-arms, and a single toggle-link, $v'$, jointed to the actuating-bar and the other clamp-arm by being pivoted at its opposite ends in the forks of the bar and arm make up the toggle-joint connection. The operation of this modified mechanism will be obvious.

We claim as of our own invention—

1. The combination of the axles, their boxes, the endwise-reciprocating carrying-frame, the housings at the ends of the carrying-frame having guideway-connection with the boxes, the springs for controlling the reciprocating movement of the carrying-frame, and the gripping apparatus connected with the carrying-frame, substantially as and for the purpose set forth.

2. The combination of the axles, the boxes sliding on the axles, the carrying-frame, the housings connecting it with the boxes, and the gripping apparatus connected with the carrying-frame, substantially as and for the purpose set forth.

3. The combination of the axles, the boxes sliding thereon, the reciprocating carrying-frame, its housings having guideway-connection with the boxes, and the springs C C′, supported at their ends in sockets D $d$ D′ $d'$ of the housings and boxes, substantially as and for the purpose set forth.

4. The sliding boxes B′, having the guideway-grooves $b$ widening from their middles toward their ends, substantially as and for the purpose set forth.

5. The boxes B′, provided with the spring-securing sockets $d$ $d'$ at their opposite ends, substantially as and for the purpose set forth.

6. The boxes B′, having the oil-reservoirs $B^3$ on opposite sides of their grooved central portions, substantially as and for the purpose set forth.

7. The combination of the axles, the sliding boxes having the outer and inner flanges, E E′, the carrying-frame having the box-housings, the stop-collars $E^2$, secured to the axles, and the inner and outer dust-guard collars secured to the box-flanges, substantially as and for the purpose set forth.

8. The combination of the carrying-frame, the vertically-adjustable cross-head having guideway-connection with the carrying-frame, the gripper-shank connected with the cross-head, the hinged clamp-jaws carried by the gripper-shank, the clamp-arms, and the clamp-actuating mechanism carried by the cross-head, substantially as and for the purpose set forth.

9. The combination of the carrying-frame, the vertically-adjustable cross-head having guideway-connection with the carrying-frame and provided with the receiving-block, the gripper-shank having dowel-pin connection with the cross-head and receiving-block, and the pivoted latch, substantially as and for the purpose set forth.

10. The combination of the carrying-frame, the vertically-adjustable cross-head having guideway-connection with the carrying-frame, the gripper-shank connected with the cross-head, the gear-racks at the opposite ends of the cross-head, the segment-gears engaging the gear-racks, the rock-shafts to which the segment-gears are fastened, the actuating rock-shaft, its cranks connected with cranks of the segment-gear rock-shafts, the controlling-lever secured to the actuating rock-shaft, and the detent devices for this lever, substantially as and for the purpose set forth.

11. The combination of the carrying-frame, the cross-head having guideway-connection with the carrying-frame, the mechanism for vertically adjusting the cross-head, the gripper-shank connected with the cross-head, the hinged clamp-jaws carried by the gripper-shank, the clamp-arms, the clamp-actuating bar vertically adjustable with the gripper-shank and having connection with the clamp-arms, and the mechanism carried by the cross-head for vertically adjusting the clamp-actuating bar independently of the gripper-shank, and its adjusting mechanism to open and close the clamp-jaws, substantially as set forth.

12. The combination of the carrying-frame, the vertically-adjustable cross-head having guideway-connection with the carrying-frame, the gripper-shank connected with the cross-head, the hinged clamp-jaws carried by the gripper-shank, the clamp-arms, the vertically-reciprocating clamp-actuating bar connected with the clamp-arms, its gear-rack, the segment-gear engaging this gear-rack and carried by the cross-head, the segment-actuating lever, and its detent devices, substantially as and for the purpose set forth.

13. The combination of the gripper-shank, the hinged clamp-jaws, the clamp-arms, their anti-friction rollers with projecting shafts, the vertically-adjustable clamp-actuating bar and the wedge-block carried thereby, and having the inclined ways for the anti-friction rollers and their shafts, substantially as and for the purpose set forth.

14. The combination of the carrying-frame, the vertically-adjustable gripping apparatus having guideway-connection with the carrying-frame, the controlling-lever, by connection with which the gripping apparatus is adjusted, and the counterbalancing-spring, with which the lever is connected, substantially as and for the purpose set forth.

15. The combination of the carrying-frame, the vertically-adjustable gripping apparatus, the controlling-lever for adjusting the gripping apparatus, the chain secured at one end to the boss of the lever, the piston-rod, to which the opposite end of the chain is connected, the piston, the coiled spring, and the cylinder, substantially as and for the purpose set forth.

16. The combination of a clamp-jaw having the longitudinally-extending lining-recess with the socket midway thereof, and the lining having the lug $t$ entering the socket and detachably pinned therein, substantially as and for the purpose set forth.

17. The combination of the clamp-jaws provided with the roller-sockets in their interior surfaces, the non-yielding ball-rollers rotating in said sockets, and the removably-secured linings, by which the rollers are retained against accidental displacement, as and for the purpose set forth.

18. The combination of the clamp-jaws provided with the roller-sockets in their exterior surfaces, the ball-rollers rotating in said sockets, and the retaining-rings for the rollers, as and for the purpose set forth.

In testimony whereof we have hereunto subscribed our names.

EDWARD NOBLE, JR.
GEORGE F. BRANHAM.

Witnesses:
S. H. COBB,
EDWARD S. EMMONS.